(12) United States Patent
Jha et al.

(10) Patent No.: US 12,543,107 B2
(45) Date of Patent: Feb. 3, 2026

(54) NETWORK SLICE RESILIENCY

(71) Applicant: Intel Corporation, Santa Clara, CA (US)

(72) Inventors: Satish Chandra Jha, Portland, OR (US); S M Iftekharul Alam, Hillsboro, OR (US); Vesh Raj Sharma Banjade, Portland, OR (US); Ned M. Smith, Beaverton, OR (US); Arvind Merwaday, Beaverton, OR (US); Kshitij Arun Doshi, Tempe, AZ (US); Francesc Guim Bernat, Barcelona (ES); Liuyang Lily Yang, Portland, OR (US); Kuilin Clark Chen, Portland, OR (US); Christian Maciocco, Portland, OR (US); Marcio Rogerio Juliato, Portland, OR (US); Maruti Gupta Hyde, Portland, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 17/711,579

(22) Filed: Apr. 1, 2022

(65) Prior Publication Data
US 2022/0225227 A1 Jul. 14, 2022

(51) Int. Cl.
*H04W 48/18* (2009.01)
*H04W 24/02* (2009.01)
*H04W 28/24* (2009.01)
*H04W 72/54* (2023.01)

(52) U.S. Cl.
CPC ........... *H04W 48/18* (2013.01); *H04W 24/02* (2013.01); *H04W 28/24* (2013.01); *H04W 72/54* (2023.01)

(58) Field of Classification Search
CPC ..... H04W 24/02; H04W 24/04; H04W 28/24; H04W 48/18; H04W 72/54
See application file for complete search history.

(56) References Cited

U.S. PATENT DOCUMENTS

2019/0327153 A1* 10/2019 Wahlqvist ........... H04L 41/0894
2023/0261952 A1* 8/2023 Chamarthi .......... H04L 41/5051
709/221

* cited by examiner

*Primary Examiner* — Mansour Oveissi
(74) *Attorney, Agent, or Firm* — Schwegman Lundberg & Woessner, P.A.

(57) ABSTRACT

System and techniques for network slice resiliency are described herein. An indication of a fault-attack-failure-outage (FAFO) event for a network slice may be received. Here, the network slice is one of multiple network slices. A capacity in a slice segment may be estimated to determine whether there is enough capacity to meet a service level agreement (SLA) of the multiple network slices based on the FAFO event. In this case, the slice segment is a set of physical resources shared by the multiple network slices. Operation of the slice segment may then be modified based on results from estimating the capacity in the slice segment to address impacts from the FAFO event.

24 Claims, 6 Drawing Sheets

NETWORK SLICE RESILIENCY

TECHNICAL FIELD

Embodiments described herein generally relate to computer networking infrastructure and more specifically to network slice resiliency.

BACKGROUND

Cellular communications technologies enable device connectivity to a level unavailable in the past. As time as progressed, the reliability and speed with which these technologies deliver data has continued to increase. Next-generation networks, such as those implemented in accordance with a Third Generation Partnership Project (3GPP) family of standards, continue to experience growing demand to transfer more information per second. While fifth generation cellular (5G) is still in its infancy, there has been an increased shift in the research community to communication technologies for sixth generation cellular (6G) networks. Academia, industry, and standardization bodies are already working on identifying candidate key performance indicators (KPIs) for future 6G services, use cases, or applications.

Many existing networks implement service level agreements (SLAs), or service level requirements (SLRs), that define performance expectations for different levels of service. SLA definitions are used by networking hardware to, for example, deliver some packets out of order before other packets to ensure a priority level of the SLA is met. Thus, the SLA drives resource utilization strategies in the network. Often, SLAs are defined for normal operating conditions—those conditions in which the network finds itself most of the time—rather than extraordinary operating conditions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

Figure 1:
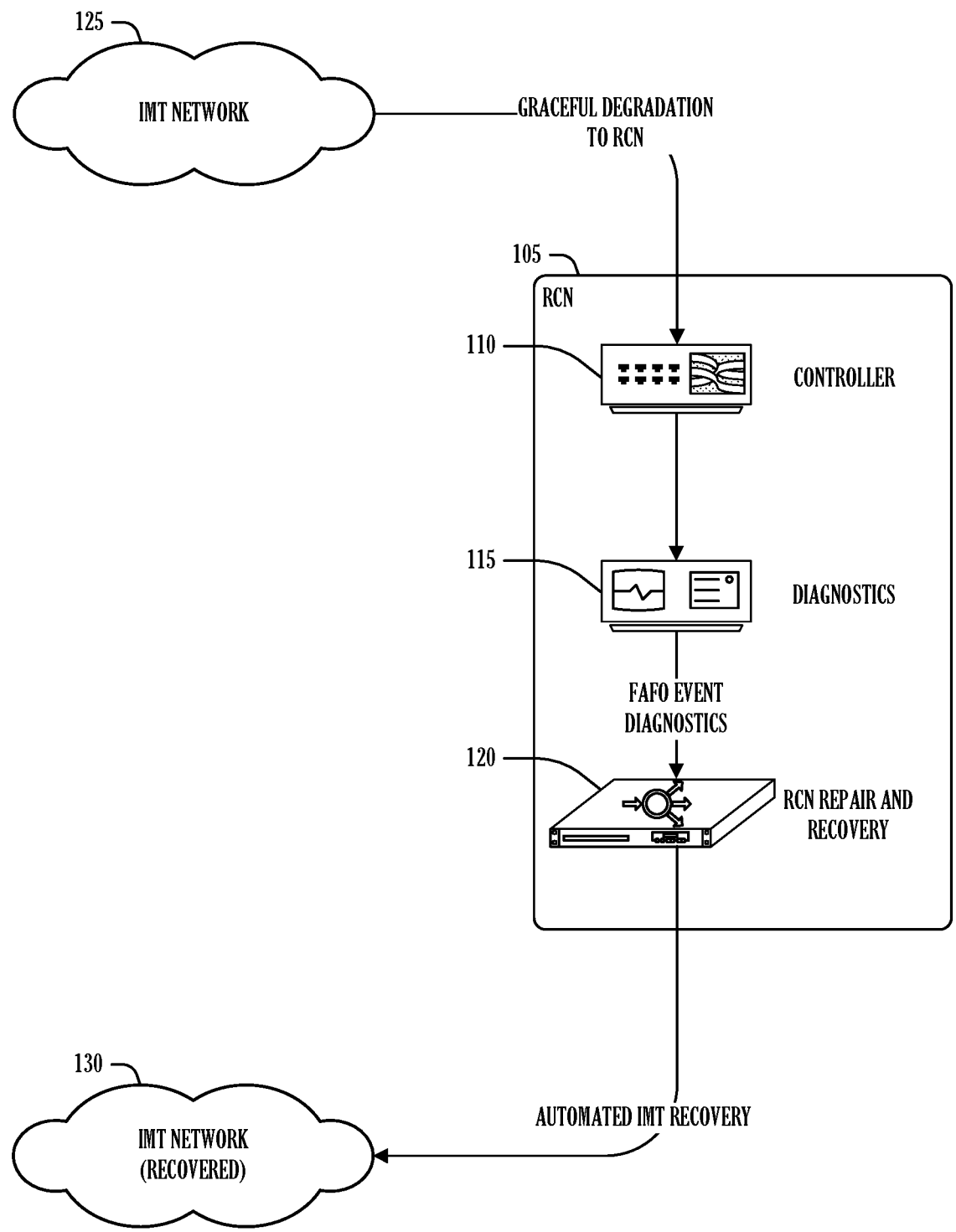
FIG. 1 is a block diagram of an example of an environment including a system for network slice resiliency, according to an embodiment.

DETAILED DESCRIPTION 5G and beyond telecommunications networks are envisaged to offer differentiated services that support diverse vertical industries (e.g., transportation, automated driving, manufacturing, media, and entertainment) with a common network platform offering heterogeneous SLAs containing diverse requirements (e.g., high-bandwidth, low-latency, massive-multi-connection networks, secure networks, etc.). These verticals, or service-types, may involve diverse end-to-end communication, computation, or different end-to-end security properties. Differentiated resiliency services use network slicing to logically isolate or to physically partition network resources. The physical network may support multiple logically independent network topologies or functions through virtualization. The physical infrastructure and network mobile core may generate a network slice for each service-type. The logical independence of slices enables scalable customized network functions that are independent of operation and management (OAM) solutions for both the existing 5G and future evolved network service-types.

End-to-end (E2E) network slicing enables construction of multiple independent logical networks from a single physical network that may extend from the radio access network (RAN) to the core network to applications or services dedicated to specific slices. E2E slicing may use Software Defined Networking (SDN) or Network Function Virtualization (NFV) to address diverse vertical application requirements. A network slice may have multiple segments. For example, a typical slice may have logical segments such as a 'Radio resources segment' (e.g., frequency, spectrum, time, or code resources at the physical (PHY) layer, transmission technologies, etc.), a 'Radio access Edge resources or functions segment' (e.g., various media access control (MAC), radio link control (RLC), or packet data convergence protocol (PDCP) functions implemented at edge), 'Core Segment' (e.g., user plane or control plane network functions implemented at the edge or in a regional data center), among others. Herein, a segment may represent logical isolation or separation of resources, such as isolation of location of physical resources (base station (BS), Edge, Regional Telecommunications data center, etc.), separation of services and network functions (e.g., access NFs versus core NFs, user plane versus control plane NFs at access or core, etc.), for each slice.

Typically, an end-to-end SLA depends on the performance and service levels of each network segment within the end-to-end context. Disruption in any segment may affect the end-to-end service level. A challenge facing resilient next generation end-to-end logically independent networks is maintenance of the end-to-end SLA when Fault-Attack-Failure-Outage (FAFO) events disrupt a network segment or one of the resource slices. The extraordinary operating conditions that may follow FAFO events often cause SLAs to fail.

While limited slicing functionality may be supported in fourth generation (4G) or Long Term Evolution (LTE) networks—for example, based on device International Mobile Subscriber Identity (IMSI) or Access Point Name (APN) (e.g., network Internet Protocol (IP) Pool)—full end-to-end slicing capability, from the radio through the mobile core of the network, appeared starting with 5G networks. However, there is not an end-to-end SLA mechanism to address network disruption scenarios for resource slicing.

To address the issues above, network disruptions may be compensated by temporarily reconfiguring segments or slices to divert resources to other segments or slices to restore expected levels of service. In an example, FAFO events may be predicted. Here, redundant resource pools from other segments or slices may be proactively assigned to automatically maintain end-to-end SLAs. For example, if latency or reliability of a radio resources slice-segment have been impacted due to a FAFO event, a radio access edge resources slice segment or a functions slice-segment or a core slice-segment may be established by proactively assigning reconfigured resources or switching to a new KPI slice-segment with lower latency and higher reliability. Similarly, redundancy in edge or core segments may be increased to reduce latency or to increase reliability.

In an example, a Cross-Slice-Segment Coordinator (CSSC) may be used for tight coordination across slice-segments. The CSSC may be configured to estimate or analyze SLA impacts at segment boundaries to predict consequences of FAFO events and to assess damage (e.g., impacts to network performance) from actual FAFO events. The CSSC is configured to determine whether it is possible to compensate a network failure to meet an SLA using resources in other segments for all traffic in the slice, or whether network repair functions are able to restore service within an acceptable time period. In an example, if such compensation or repair is not possible as evaluated by the CSSC, low priority traffic may be suspended. In an example, redundant resources (e.g., previously unallocated hardware) may be employed for high priority traffic to continue. Higher priority traffic (e.g., not suspended traffic), with selected actions—such as, reconfiguring slice-segments, increase redundancy in segments by adding more RAN resources, duplicating component, NF, or micro-services per-slice at core, etc.—is identified to compensate SLA impacts. In cases where FAFO events are predicted, the CSSC may be configured to coordinate with admission control services to limit new traffic injections, for example, barring (e.g., blocking, dropping, etc.) low priority traffic or buffering latency tolerant traffic.

In an example, the CSSC is configured to analyze an SLA for a slice that is affected by a FAFO event to determine actions to contain the damage resulting from the FAFO event. For example, the CSSC may determine a resource level required to address the FAFO event. In the event that the FAFO event affects a large portion of say, the enhanced Mobile Broadband (eMBB) traffic slice, then the CSSC may be configured to prevent cascading effects to other slices by reallocating resources from low-priority SLAs or redundant resource pools while ensuring the other SLAs for the other slices are not violated.

In an example, a Slice-Segment resource manager (SS-RM) may be used at slice-segments to monitor slice-resource use or exhaustion. The SS-RM may be configured to proactively act to avoid resource exhaustion. For example, when load or congestion on a slice-resource approaches a threshold, the SS-RM is configured to enforce restrictions on applications to limit maximum occupancy of slice-resources based on usage priorities of applications or to direct new traffic to an alternate slice.

Using the systems and techniques described herein, SLAs are more likely to be met under the extraordinary operating conditions resulting from FAFO events. Thus, a level of resiliency to sustain SLAs against adverse events in the network and provide additional guarantees that critical traffic will be delivered to its destination within established SLAs. Additional details and examples are provided below.

FIG. 1 is a block diagram of an example of an environment including a system for network slice resiliency, according to an embodiment. As illustrated, an International Mobile Telecommunications (IMT) network 125 (e.g., a cellular network) is communicatively coupled to a resiliency control network (RCN) 105, sometimes called a Resilient & Intelligent NextG Systems (RINGS) control network. The RCN 105 is a collection of networking nodes, such as the illustrated controller 110, diagnostic device 115, and the repair and recovery device 120. Each of these devices are implemented in computer hardware to support the correction of the IMT 125 into a recovered version of the IMT 130. In an example, the RCN 105 is a single node that includes each of the illustrated elements. In this example, the elements may be implemented in processing circuitry of the node.

In an example, the RCN 105 is configured to manage or control data plane layers of the IMT 125 through a dedicated and isolated control plane that executes layer-specific management functions, such as Communications Service Management Functions (CSMF), Network Slice Management Functions (NSMF), or Resource Management Functions (RMF). In general, RCN nodes, including the RCN 105, may configure sentinels to detect FAFO events, or configure controllers to execute resiliency functions designed to repair and recover data plane resources, slices, or services. In an example, the RCN 105 is designed to resist FAFO events using proactive resiliency-by-design techniques.

For clarity and simplicity, the following examples of the RCN implementation refer to the processing circuitry resident within the RCN 105, whether within a single node or spread across several nodes. To implement network slice resiliency, the processing circuitry is configured to obtain (e.g., via the controller 110) an indication of a FAFO event for a network slice. In these examples, the network slice is one of multiple network slices in operation in the IMT 125. The indication of the FAFO event may be a warning transmitted from another RCN, a monitoring device of the IMT 125, or a node of the IMT 125 that detects the problem. In an example, the indication of the FAFO event may be determined by the RCN 105 via the diagnostic device 115 (or service) hosted by the RCN 105. In any case, the indication provides evidence sufficient for the RCN 105 to act. For example, an SLA threshold has been violated at a rate beyond defined operating tolerances.

The processing circuitry is configured to estimate capacity in a slice segment to meet service level agreements (SLAs) of the multiple network slices based on the FAFO event. Here, the slice segment is a set of physical resources shared by the multiple network slices. For example, a radio slice segment may include frequencies or codes that are logically divided among slices. Other slice segments may include hardware at a base station or in the core network of the IMT 125. While slices may be considered vertical portions of the IMT 125, slice segments may be considered the horizontal portions of the IMT 125. In this context, estimating the slice segment capacity involves determining whether, for example, is enough available processing at a base station to handle the traffic—such as retransmission traffic or excess traffic in a denial of service attack—of the slices that use the slice segment. In general, the traffic or computing (e.g., to remove virus signatures) levels determined to be needed to address the impact of the FAFO event are estimated. The expected resources are then compared with the capacity of the slice segment, with respect to the affected slice or the slice segment as a whole. If the comparison demonstrates that the slice segment includes sufficient capacity, then the slice segment meets the SLA based on the predicated or actual FAFO event impact; otherwise, it does not.

Because slices are logically isolated from each other, using techniques such as hardware partitioning, virtualization, etc., it may be the case that the hardware allocated to the FAFO event affected slice is not capable of meeting the SLA for that slice, but other hardware within a slice segment is available. That is, hardware in the slice segment may be unallocated or allocated to another slice that does not need the hardware to meet the SLA for that second slice. Accordingly, in an example, hardware allocated to a second network slice is estimated by the processing circuitry to be unnecessary for the second network slice to meet an SLA defined for the second network slice. As noted below, these available resources may be used to address the impact of the FAFO event on the network slice.

In an example, estimating the capacity indicates that SLAs of the multiple network slices cannot be met (e.g., where a full recovery from the FAFO is not possible). This example notes another possibility, that there are insufficient resources in a slice segment to address the impact of the FAFO event while meeting the SLAs of each of the network slices operating from the slice segment. As noted below, in this case, other techniques are employed to mitigate the effects (e.g., to affect a partial recovery) of the FAFO event. However, generally, a degradation in some service by one or more slices will result. In an example, the RCN may employ a graceful degradation strategy when degradation of service is determined to be happening. For example, given two SLAs assigning the same level of workload priority, a round-robin resource allocation strategy may be used to evenly divide resources between the two workloads. Alternatively, all resources may be allocated to the first workload to run in a shortened time slice after which the resources are assigned to the second workload for a shortened time slice and so forth. In an example, SLAs may require workloads to specify a minimum viable resource allocation (MVRA) that determines a threshold resource utilization governing a switch from a resource minimization strategy to a time slice minimization strategy.

In an example, the processing circuitry is configured to determine hardware necessary for a given slice to meet the SLA of that slice. For example, the processing circuitry may maintain a set of hardware profiles for the network slice. In an example, a member of the set of hardware profiles indicates a combination of hardware evaluated to meet an SLA for the network slice. This database of hardware profiles may be predefined or created by observing operations on the network slice. For example, the processing circuitry may be configured to monitor resource use by the slice at the slice segment during normal use, or a normal operation period. Here, the normal operation period is defined, such as through a statistical relevance with respect to other operational periods, or through predefined network tolerances. In an example, the normal operation period is a period of time in which no FAFO event is indicated.

To build the set of hardware profiles, the processing circuitry is configured to monitor (e.g., via the diagnostic device 115) the hardware components, and even allocate different hardware components, to the slice to determine impacts various hardware components have on slice performance. Combinations of hardware components—such as an accelerator, processor, storage device, etc.—may be written as a member of the set of hardware profiles. In an example, the performance of the hardware component combination is evaluated against a predefined performance threshold to determine whether to write the combination into the set of hardware profiles. Thus, if a particular combination did not satisfy the SLA under normal operating conditions, that combination is omitted from the set of hardware profiles.

The processing circuitry is configured to modify operation of the slice segment—using the repair and recovery device 120 to access a dedicated and isolated control plane—on results from estimating the capacity in the slice segment. Thus, the processing circuitry addresses the FAFO event impact by, for example, allocating more hardware or adjusting network traffic. For example, in the example provided above where the second slice was allocated excessive hardware to meet the SLA of the second slice, the processing circuitry is configured to allocate the hardware reserved for the second network slice to the network slice experiencing the FAFO event. In an example, the slice segment may include unallocated (e.g., reserve) hardware that is not allocated to any given slice under normal operation. Here, the slice segment may be modified by allocate some or all of such unallocated hardware to the slice segment. In an example, the reserve hardware allocation is temporary. In this example, the reserve hardware is unallocated upon a trigger condition, such as the passing of the FAFO event, a predefined timer period, or upon the implementation of another modification to the slice segment. Thus, for example, the reserve hardware may fill a time gap between needed to deallocate the hardware from the second slice and reallocate that hardware to the slice.

In an example, when the capacity estimation above indicates that SLAs of the multiple network slices cannot be met, the processing circuitry is configured to modify the operation of the slice segment by requesting an admission controller to reduce traffic injection based on priority. Here, the admission controller is a switch or gateway accepting data (e.g., packets) at the slice segment. The admission controller may be instructed to turn away (e.g., drop) packets with a low priority, delay (e.g., buffer) packets with a middle priority, and pass through packets with a high priority. In any case, the network infrastructure is leveraged to reduce data flow such that the available hardware at the slice segment may handle the data flow. By basing the reduction on priority, the most important SLAs are more likely to be met, leaving lower priority SLA to bear the majority of the FAFO event impacts.

In an example, where the capacity estimation above indicates that SLAs of the multiple network slices cannot be met, operation of the slice segment may be modified to buffer latency tolerant traffic during the FAFO event. This is a partial measure compared to the traffic blocking mentioned above. Here, traffic that is non latency sensitive is stored to reduce the rate at which it needs to be processed. This may, for example, provide time to allocate additional hardware resources to the slice. In an example, latency tolerant traffic may be identified by a flag within the traffic, the SLA under which the traffic operates, or by correlating identifying features of the traffic with a database of latency tolerant traffic, for example.

In an example, where the capacity estimation above indicates that SLAs of the multiple network slices cannot be met, operation of the slice segment may be modified to direct a sender of the traffic to use a second network slice from the multiple network slices. Here, there is an attempt to isolate the FAFO event to the slice and notify the entities (e.g., software or hardware) using the slice that another slice should be used. In order to control the impact redirecting the traffic will have on the other slices, and thus the SLAs of those other slices, the processing circuitry is configured to specify which second slice should be used for the traffic.

In an example, the processing circuitry is configured to monitor operation of the network slice over a sliding time period to produce a slice-segment-resource-busy-ratio (SSR-BR) for a hardware resource (e.g., component) of the slice segment. The sliding window ensures that the SSR-BR is presently relevant and not influence by long passed events. The SSR-BR is hardware resource (e.g., memory, an accelerator, etc.) specific but applies across all slices. Thus, the SSR-BR measures how busy the hardware resource is within the present time period regardless of which slice is using the hardware resource.

In an example, the processing circuitry is configured to produce a slice-segment-resource occupancy-ratio (SSR-OR) for the hardware resource. The SSR-OR is slice, or application, specific as opposed to the SSR-BR. Thus, the SSR-OR enables one to determine what impact a specific application or slice has with respect to the hardware resource. In an example, if the SSR-BR is determined by the processing circuitry to be beyond a threshold, the indication of the FAFO event may be created by the processing circuitry in response. This last example illustrates FAFO event detection, or prediction, by the RCN 105. A rise in the SSR-BR beyond the threshold indicates that the overall utilization of the hardware resources is unexpected, abnormal, or extraordinary and indicative of a FAFO event.

In an example, when the SSR-OR is determined to be beyond a threshold (e.g., an SSR-OR threshold), the processing circuitry is configured to limit access to the hardware resource, by the application or the slice. In an example, limiting access means preventing access. In an example, the access limitation persists until the SSR-OR meets (e.g., is equal to or less than) the threshold. In an example, limiting access include buffering latency tolerant traffic for a pre-defined period of time. In an example, the threshold is based on a priority of an application generating the SSR-OR. By observing hardware resource utilization by the application, an uptick in SSR-OR—for example, without a corresponding increase in SSR-BR—may indicate that the application or the slice are exhibiting atypical behavior indicative of a FAFO event.

Figure 2:
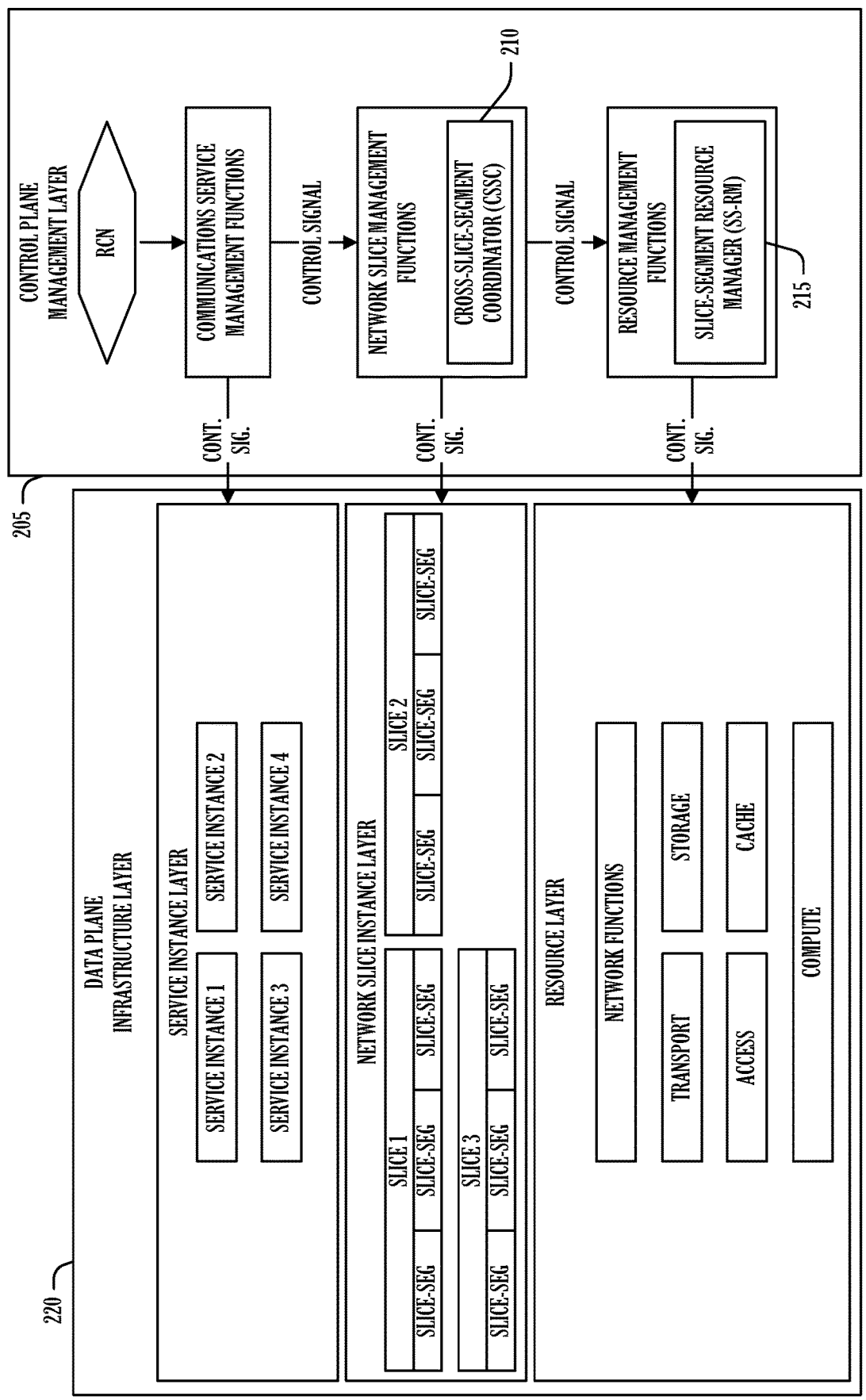
FIG. 2 illustrates an example of a network slice framework including control and data planes, according to an embodiment.

FIG. 2 illustrates an example of a network slice framework including control and data planes, according to an embodiment. The illustrated network slice framework conforms to current IMT development, such as the 3GPP network slice framework. The network slice framework separates the network slice infrastructure into a data plane 220 and a control plane 205. The data plane 220 includes a Network Slice Service Instance (NSSI) layer, Network Slice Instance (NSI) Layer, and Network Slice Resource (NSR) layer. The NSR layer provisions, allocates, and earmarks resources for use by the NSI. The NSI determines how network resources are configured for achieving resiliency goals. Slices define which configuration of core network; access network; and communications are essential for hosting services or workloads. Resiliency goals are factored into the configuration to ensure slice configurations may be torn down and reconstructed in response to FAFO events. NSSI performs workload and SLA operations utilizing the lower layers.

As mentioned above, end-to-end network slicing enables multiple, independent, logical networks to be constructed on a single physical network from RAN to core network. This may be accomplished using SDN and NFV techniques to address diverse vertical application requirements in 5G or NextG (e.g., 6G) networks. A single physical network generalizes corresponding network topology and functions through virtualization based on a unified physical infrastructure, generating a network slice for each vertical (e.g., end-to-end application or service-type).

Each end-to-end slice may be viewed as multiple segments (e.g., slice-segments) from radio access to core network. For example, a typical slice may have logical segments such as a radio resources segment (e.g., frequency/spectrum/time/code resources at PHY layer, transmission technologies, etc.), a radio access edge resources or functions segment (e.g., various MAC, RLC, PDCP functions implemented at edge resources), or a core segment (e.g., user plane or control plane network functions implemented at edge or regional data center resources), among others. Here the segment may represent a logical isolation or separation of resources, isolating a location of physical resources—such as isolating a BS from an edge node, from a regional telecommunications center, etc.—or separating services or network functions (access NFs versus core NFs, user plane versus control plane NFs at access or core), among others, for each slice in a typical IMT.

End-to-end network slicing creates isolation for targeted verticals with specific SLAs, such as performance SLAs, security SLAs, etc. SLA assurance for a slice may depend on the performance of each segment of the slice. Disruption in any segment of the slice may impact overall SLA for the end-to-end slice. When resource dynamics change—such as due to a demand, a load, or a congestion change or occurrence of FAFO events—in any segment of the slice, a CSSC 210, in a control plane 205, may be configured to evaluate the situation, estimate the impact of the event, and operation to provide resources to address the impacts of the event. In an example, the CSSC 210 is configured to prompt other slice-segments, or act itself, to modify slice operations to satisfy current SLAs.

In general, the CSSC 210 provides tight coordination across slice-segments. Thus, the CSSC 210 is configured to estimate or analyze the impact of a present or predicted FAFO event on an SLA at segment boundaries. The CSSC 210 may determine whether the SLA may be compensated by other segments for all traffic in the slice. If not, pre-configured policies may be applied by CSSC 210. Several such policies may be setup by a network operator (e.g., administrator) to specify how to handle various types of traffic, such as low priority traffic, high priority traffic, high priority traffic with delay-sensitive profiles, etc. Selection of one or more such policies may be based on the assessed impact severity or expected time for which FAFO event will last. The following list illustrates some examples of policies that the CSSC 210 may be defined to take:

1. Suspending some low priority traffic until impacted slice-segment is restored.
2. Suspending some low priority traffic for a pre-defined time.
3. Delaying some low priority traffic for a pre-defined time.
4. Limiting access to resources for the low priority traffic to a minimal amount.

Implementing any of these above policies may provide redundant resources for other high priority traffic. For other traffic that is not suspended, delayed, or had resource access limit imposed, CSSC 210 may be configured to select actions—such as reconfiguring slice-segments, increasing redundancy in slice segments by more RAB resources for example, duplicating component, NF, or micro-services per-slice at core, etc.)—to compensate a current or predicted FAFO event impact on an SLA a slice segment.

In an example, where the FAFO event is predicted rather than directly observed, the CSSC 210 may be configured to alert (e.g., warn) or coordinate with an admission control entity for the slice to reduce traffic injection. This may be accomplished by applying pre-configured or defined policies. Several such policies may be setup for admission control by a network operator, the policies defining how to handle various types of traffic to reduce traffic injection in the impacted slice. Selection of one or more such policies may depend on the assessed impact severity and expected time for which FAFO event will last. The following list provides some examples of these policies:

1. Barring low priority traffic until impacted slice-segment is restored.
2. Barring low priority traffic for a pre-defined time.
3. Limiting admission rate of low-priority traffic to a pre-configured minimal rate.
4. Buffering latency tolerant traffic for a pre-defined time.
5. Coordinating with an inter-slice coordinator to offload some traffic (e.g., high priority traffic with delay-sensitive profile) to adjacent slice(s). This may be particularly useful when impact of FAFO event is severe or the FAFO event is expected to last for a long time.

In an example, the illustrated SS-RM 215 is configured to monitor resources—or a defined subset of resources (e.g., critical resources)—in each slice-segment. The SS-RM may be configured to proactively implement actions when, for example, load or congestion on these resources increases beyond a pre-defined threshold. Such action may avoid potential exploitation or exhaustion of slice-resources.

Figure 3:
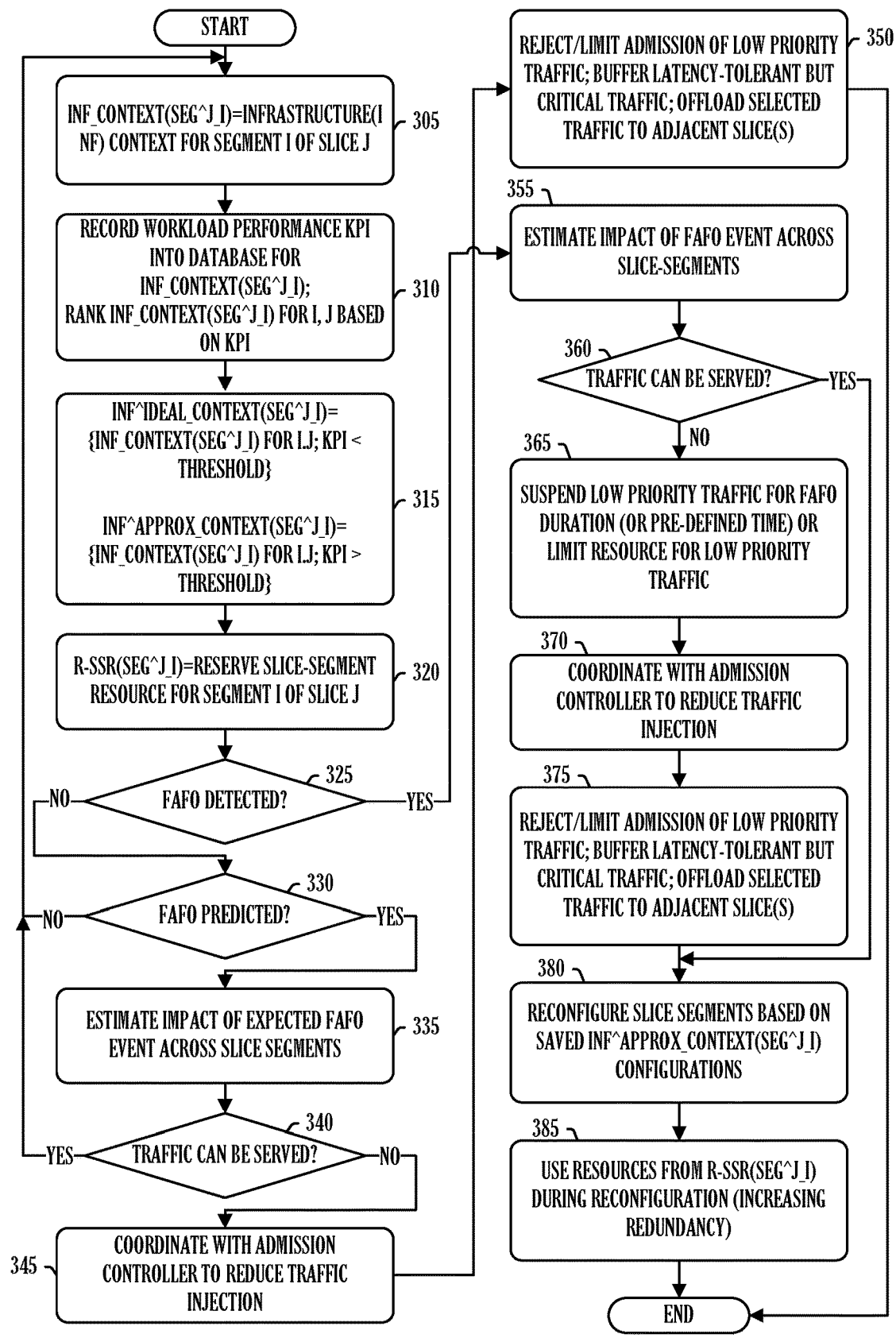
FIG. 3 illustrates an example of a control flow for cross-slice segment coordination, according to an embodiment.

FIG. 3 illustrates an example of a control flow for cross-slice segment coordination, according to an embodiment. The illustrated flow may be implemented by a CSSC, such as the CSSC 210 illustrated in FIG. 2.

Slice segments may be virtualized (operation 305) using infrastructures (INF) where a slice composition is assigned to one infrastructure (INF-1) and another slice composition is assigned to a different non-overlapping infrastructure (INF-2). The INF contexts may be used to improve SLA efficiency by maintaining a history of workload performance KPIs at various slice compositions (operation 310). Each composition is ranked according to the KPI performance per workload. A set of profile INF configurations (e.g., hardware profiles) may be constructed (operation 315) that approximates the ideal slice composition and a series of approximations ranging to less ideal to a threshold KPI that defines the point of diminishing return.

In an example, when faced with FAFO events that disrupt ideal (e.g., normal) conditions, the current state of the operational infrastructures, called Operational Infrastructure Intelligence (OII), may be assessed. The OII may be used to perform a pattern matching technique (e.g., best fit or first fit) to identify an optimized INF configuration from which to base a network reconfiguration strategy given the current state of operational resources.

Each Slice segment may set aside a small amount of reserved slice-segment resource (SSR) (operation 320) for transient use by peer slice segments of other slices as part of a multi-lateral cooperative arrangement. Such a reserved resource may be referred to as Reserved SSR for Peers (R-SSR-Peer). The R-SSR-Peer may be available for assignment with low coordination overhead, e.g., for short periods of time, to traffic in other segments that are experiencing a transient spike or FAFO disruptions. Information about available R-SSR-Peer resources may be maintained, for example, by the CSSC. Upon detection of potential FAFO events or SSR congestion in a slice-segment, a slice-segment may be directed to use R-SSR-Peer until coordination with other slice-segments ensures satisfaction of applied SLAs. In case of contention (e.g., overbidding) for the R-SSR-Peer, the bandwidth may be given (e.g., for the short period of time) to one or more bidders on a randomized basis. This technique may address immediate spikes while alternative remediation is put in place.

If a FAFO event is detected (decision 325) an estimation of the FAF event impact on the slice segments is performed (operation 355). If the traffic cannot be handled given the FAFO event (decision 360), then traffic is suspended or access to resources of the slice segment are limited (e.g., for low priority traffic) (operation 365), coordination with the admission controller is performed (operation 370), or other traffic mitigation techniques—such as buffering latency tolerant traffic (operation 375) are performed. These efforts may be removed once the slice segment is reconfigured based on the INF hardware profiles (operation 380) or R-SSR-Peer resources are allocated (operation 385) to address the FAFO event.

If the FAFO event is predicted (decision 330), a similar sequence may ensue, in which capacity is estimated (operation 335) and a determination of whether the slice segment has enough capacity for the predicted FAFO event (decision 340). If the capacity is sufficient, no further action is taken with regard to the predicted FAFO event. Otherwise, coordination with the admission controller occurs to limit traffic (operation 345) or active suppression of the traffic (operation 350) is used to try and prevent the FAFO event in the first place.

Figure 4:
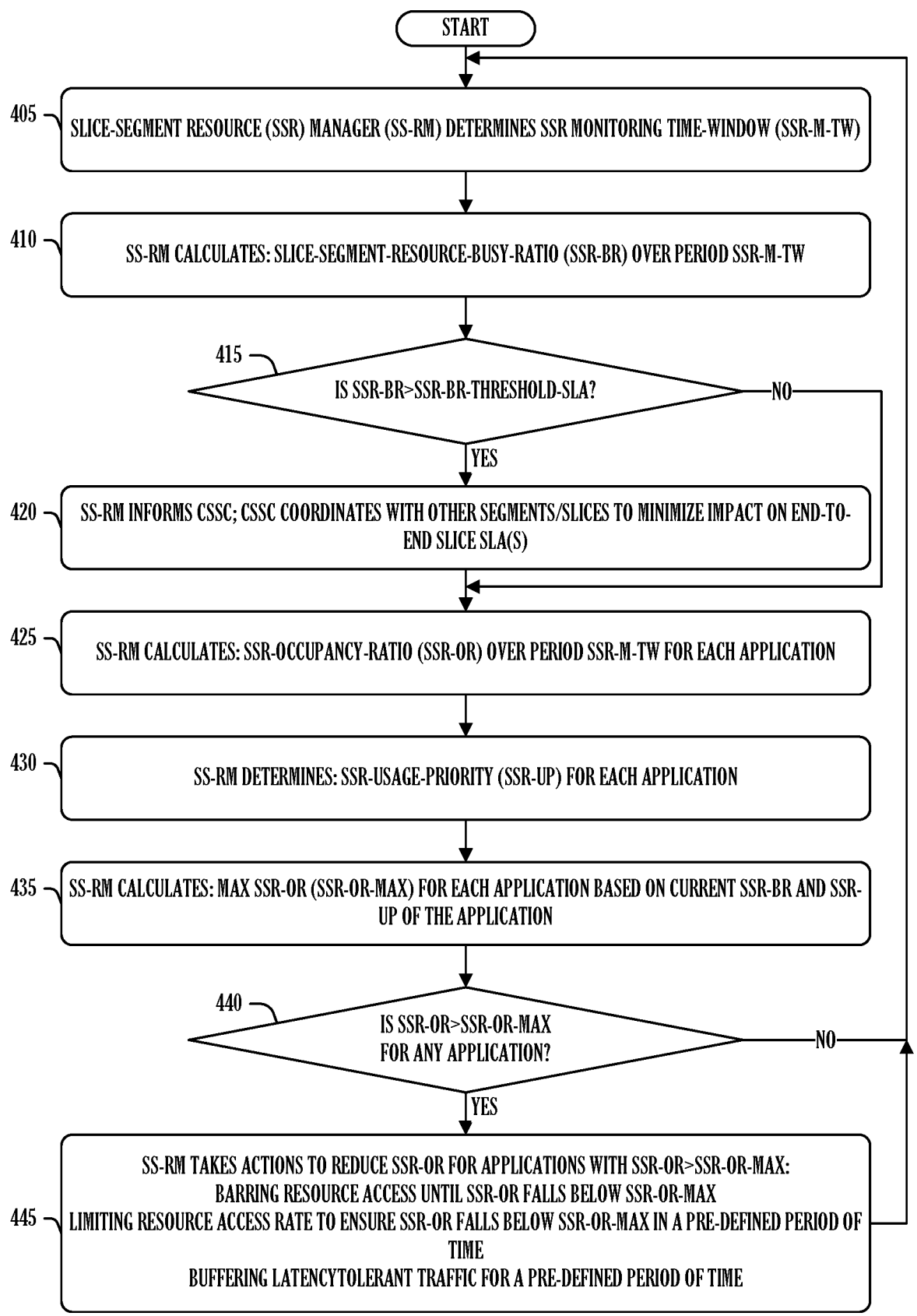
FIG. 4 illustrates an example of a control flow for slice-segment resource monitoring and management, according to an embodiment.

FIG. 4 illustrates an example of a control flow for slice-segment resource monitoring and management, according to an embodiment. Resource utilization in a slice-segment may change dynamically due to several factors, such as a change in application load or demand in the slice; a change in application load or demand in other slices which use resources with this slice-segment; or malicious applications that use resources to exhaust the resources in a slice-segment. These factors may result in degraded end-to-end slice SLA(s). The illustrated flow provides a technique by which negative resource allocation may be identified. In an example, the flow is executed by an SS-RM, such as the SS-RM 215 illustrated in FIG. 2. In an example, the SS-RM, or multiple SS-RMs, are implemented at each slice-segment.

The SS-RM determines a sliding time-window (e.g., over past ten time seconds), called SSR monitoring time-window (SSR-M-TW) (operation 405). The SS-RM calculates an overall Slice-Segment-Resource-Busy-Ratio (SSR-BR) (operation 410) and a Slice-Segment-Resource-Occupancy-Ratio (SSR-OR) (operation 425) per application. The SSR-BR is defined as the ratio of: 1) the slice-segment-resource being used by all active applications during the SSR-M-TW duration; to 2) the total slice-segment-resource available during the same period. The SSR-OR for an application is defined as the ratio of: 1) the total slice-segment-resource used by the application during SSR-M-TW duration; to 2) the total slice-segment-resource available for all applications during the same period.

The SSR-BR may be tested against a threshold (decision 415) to determine whether a resource is being over-used, threatening an impact to the SLAs of slices using the hardware resource. If the SS-BR is beyond the threshold, then the CSSC, or other cross-slice coordination device, is informed to enable mitigation of the impact (operation 420).

In an example, the SSR monitoring time-window SSR-M-TW (for SSR-BR and SSR-OR measurement) may be different for different slice-segments and may be pre-defined or configured by the network operator. For example, SSR-M-TW may be in range of several milliseconds (ms) to 100 s of ms for the radio resources segment of the slice. The SSR-M-TW may be longer for the radio access edge resources or functions slice-segment and the core slice-segment. In an example, the SSR-M-TW may be different for the SSR-BR and the SSR-OR measurements. Similarly, SSR-M-TW may be shorter for slice-segment associated with slice supporting ultra-reliable low latency communications (URLLC) applications.

In an example, an SSR-Usage-Priority (SSR-UP) may be assigned per application (operation 430). The SSR-Usage-Priority may be pre-defined or configured for various applications by the network operator. For a given value or value-range of the SSR-BR (resource load/congestion), the SS-RM may assign and enforce an upper limit (SSR-OR-Max) on resource occupancy (SSR-OR) for each application (operation 435). For example, when the SSR-BR is higher (i.e., Segment-Slice Resource is congested or highly occupied) (decision 440), each application is forced to reduce its resource occupancy to keep it below the assigned SSR-OR-Max (operation 445). SSR-OR-Max value for applications depend on the assigned priority SSR-UP as well. The following actions may be performed to reduce the SSR-OR of an application below the SSR-OR-Max for the application:

1. Barring application resource access until the SSR-OR falls below the SSR-OR-Max.
2. Limiting the resource access rate for the application to bring the SSR-OR below the SSR-OR-Max in a pre-defined time.
3. Buffering latency tolerant traffic for the application for a predefined time.

Applications with higher priorities, which result in a greater SSR-UP, are permitted higher resources occupancies—for example, by assigning a higher value to the SSR-OR-Max—for a given value or value-range of SSR-BR. When resource congestion is high (e.g., the SSR-BR is high), low priority applications may be completely barred by the SS-RM by defining SSR-OR-Max=0 while imposing occupancy limits on high priority applications. Once resource congestion, measured by the SSR-BR, decreases, low priority applications are again permitted access to the resources.

In an example, the SSR may be shared among segments of more than one slice, with each slice having a relative priority. To reflect such inter-slice relative priority while calculating SSR-UP of an application, an Inter-Slice SSR-Usage-Priority (IS-SSR-UP) may be defined and shared across SS-RMs of the slices. In an example, the SSR-UP is then calculated as (SSR-UP)*(IS-SSR-UP).

Table I and Table II below provide example implementations of resource occupancy restrictions on applications to handle exploitation or exhaustion of a slice-segment resource for various situations. Table I applies to potential exploitation or exhaustion of slice-segment resources. Here, no FAFO event or SSR exhaustion has been detected yet.

Provision by Slice-Segment Resource Manager to
avoid Exploitation on SSR (Slice-Segment Resource).
Case 1 - No FAFO or SSR Exploitation is detected/determined

| Overall SSR-Busy-Ratio (SSR-BR) in % | Limit on SSR-Occupancy-Ratio (SSR-OR-Max) in % for Applications - for Various SSR-Usage-Priority (SSR-UP) | | | | |
|---|---|---|---|---|---|
| | SSR-UP 1 (Highest Priority) | SSR-UP 2 | SSR-UP 3 | ... | SSR-UP n (Lowest Priority) |
| 0-30 | No limit | No limit | <=70 | | <=40 |
| 30-60 | No limit | <=70 | <=40 | | <=20 |
| 60-80 | <=70 | <=40 | <=10 | | <=1 |
| 80-90 | <=40 | <=5 | 0 | | 0 |
| Above 90 | <=20 | 0 | 0 | | 0 |

Table II applies after a FAFO event or resource exhaustion has been detected but a malicious application has not been identified.

Provision by Slice-Segment Resource Manager to
avoid Exploitation on SSR (Slice-Segment Resource).
Case 2 - FAFO or SSR Exploitation is detected/determined
(Malicious Application not Identified)

| Overall SSR-Busy-Ratio (SSR-BR) in % | Limit on SSR-Occupancy-Ratio (SSR-OR-Max) in % for Applications with Various SSR-Usage-Priority (SSR-UP) | | | | |
|---|---|---|---|---|---|
| | SSR-UP 1 (Highest Priority) | SSR-UP 2 | SSR-UP 3 | ... | SSR-UP n (Lowest Priority) |
| 0-30 | <=50 | <=30 | <=10 | | <=1 |
| 30-80 | <=30 | <=5 | 0 | | 0 |
| 80-90 | <=10 | 0 | 0 | | 0 |
| Above 90 | 0 | 0 | 0 | | 0 |

In an example, resource demand or occupancy-ratio from an application may be analyzed and compared with an application profile—for example, based on past resource usage data for the application—to identify abnormalities. If an abnormal behavior of the application is identified, a stricter limit on the SSR-Occupancy-Ratio (SSR-OR-Max), than that described above based on priority—may be enforced for the application.

Figure 5:
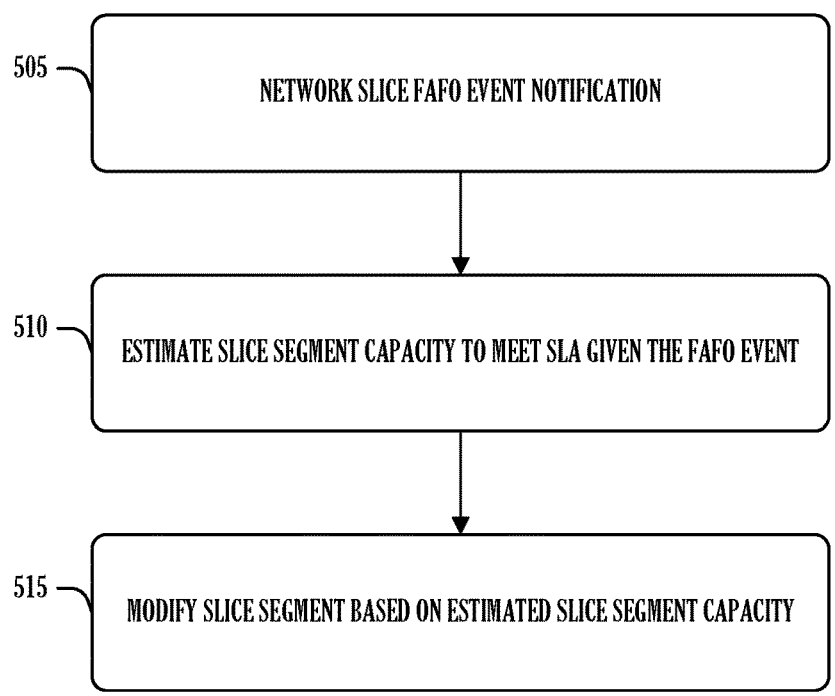
FIG. 5 illustrates a flow diagram of an example of a method for network slice resiliency, according to an embodiment.

FIG. 5 illustrates a flow diagram of an example of a method 500 for network slice resiliency, according to an embodiment. The operations of the method 500 are performed by computer hardware, such as that described above or below (e.g., processing circuitry).

At operation 505, a network slice controller obtains (e.g., retrieves or receives) an indication of a fault-attack-failure-outage (FAFO) event for a network slice. Here, the network slice is one of multiple network slices.

At operation 510, capacity in a slice segment is estimated to meet SLAs of the multiple network slices based on the FAFO event. Here, the slice segment is a set of physical resources shared by the multiple network slices. In an example, hardware allocated to a second network slice is estimated to be unnecessary for the second network slice to meet an SLA defined for the second network slice. In an example, estimating the capacity indicates that SLAs of the multiple network slices cannot be met.

In an example, the hardware is indicated in a set of hardware profiles maintained for the network slice. In an example, a member of the set of hardware profiles indicates a combination of hardware evaluated to meet an SLA for the network slice. In an example, the method 500 includes identifying a normal operation period. The normal operation period is a period of time in which no FAFO event is indicated. The network slice may be monitored during the normal operation period using a variety of hardware components from the slice segment to capture performance data. Then, combinations of the variety of hardware may be written as a member of the set of hardware profiles in response to a given combination exceeding a predefined performance threshold.

At operation 515, operation of the slice segment is modified based on results from estimating the capacity in the slice segment. In an example, where hardware allocated to a second network slice is estimated to be unnecessary for the second network slice to meet an SLA defined for the second network slice, modifying the operation of the slice segment includes allocating the hardware reserved for the second network slice to the network slice.

In an example, where estimating of the capacity indicates that SLAs of the multiple network slices cannot be met, modifying the operation of the slice segment includes requesting an admission controller to reduce traffic injection based on priority. In an example, where estimating of the capacity indicates that SLAs of the multiple network slices cannot be met, modifying the operation of the slice segment includes buffering latency tolerant traffic during the FAFO event. In an example, where estimating of the capacity indicates that SLAs of the multiple network slices cannot be met, modifying the operation of the slice segment includes directing a sender of network traffic to use a second network slice from the multiple network slices.

In an example, modifying the slice segment includes allocating reserve hardware to the network slice. Here, the reserve hardware is allocated to no network slice. In an example, the reserve hardware is allocated to the network slice until a second modification to the slice segment is made.

In an example, the method includes monitoring operation of the network slice over a sliding time period to produce a slice-segment-resource-busy-ratio (SSR-BR) for a hardware resource of the slice segment, and to produce a slice-segment-resource occupancy-ratio (SSR-OR) for the hardware resource. In an example, the method 500 includes determining that the SSR-BR is beyond a threshold, and creating the indication of the FAFO event in response to determining that the SSR-BR is beyond the threshold. In an example, the threshold is based on a priority of an application generating the SSR-BR.

In an example, the method 500 includes determining that the SSR-OR is beyond a threshold. In response, access to the hardware resource is prevented until the SSR-OR meets the threshold, access to the hardware resource is limited until the SSR-OR meets the threshold, or latency tolerant traffic is buffered for a predefined period of time. In an example, the threshold is based on a priority of an application generating the SSR-OR.

Figure 6:
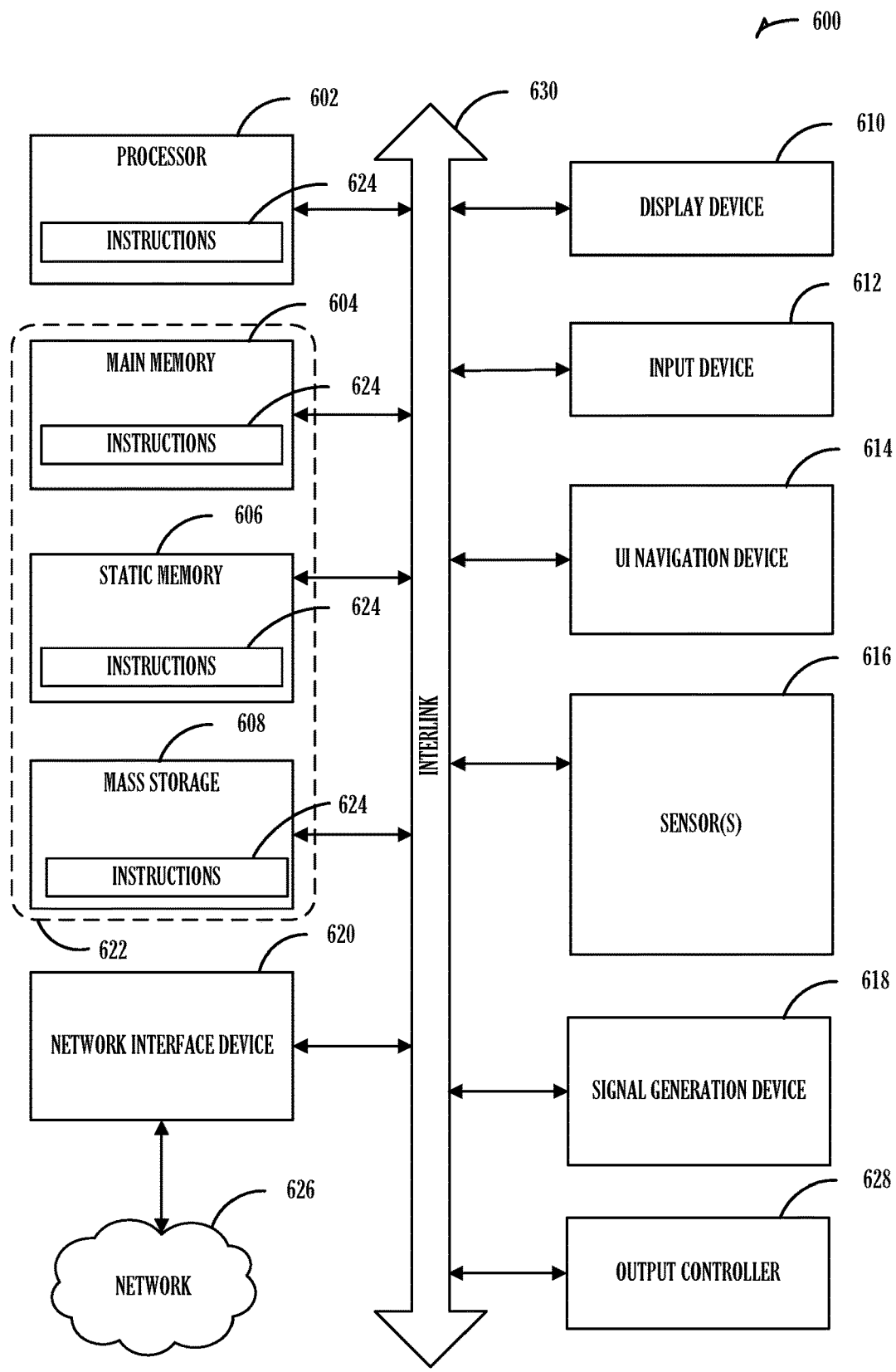
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 may be representative of the instructions 624, such as instructions 624 themselves or a format from which the instructions 624 may be derived. This format from which the instructions 624 may be derived may include source code, encoded instructions (e.g., in compressed or encrypted form), packaged instructions (e.g., split into multiple packages), or the like. The information representative of the instructions 624 in the machine readable medium 622 may be processed by processing circuitry into the instructions to implement any of the operations discussed herein. For example, deriving the instructions 624 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 may include assembly, compilation, or interpretation of the information (e.g., by the processing circuitry) to create the instructions 624 from some intermediate or preprocessed format provided by the machine readable medium 622. The information, when provided in multiple parts, may be combined, unpacked, and modified to create the instructions 624. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a network node for network slice resiliency, the network node comprising: a network interface; a memory including instructions; and processing circuitry that, when in operation, is configured by the instructions to: receive, via the network interface, an indication of a fault-attack-failure-outage (FAFO) event for a network slice, the network slice being one of multiple network slices; estimate capacity in a slice segment to meet service level agreement (SLA) of the multiple network slices based on the FAFO event, the slice segment being a set of physical resources shared by the multiple network slices; and modify operation of the slice segment based on results from estimating the capacity in the slice segment.

In Example 2, the subject matter of Example 1 optionally includes wherein hardware allocated to a second network slice is estimated to be unnecessary for the second network slice to meet an SLA defined for the second network slice, and wherein, to modify the operation of the slice segment, the processing circuitry is configured to allocate the hardware reserved for the second network slice to the network slice.

In Example 3, the subject matter of Example 2 optionally includes wherein the hardware is indicated in a set of hardware profiles maintained for the network slice, wherein a member of the set of hardware profiles indicates a combination of hardware evaluated to meet an SLA for the network slice.

In Example 4, the subject matter of Example 3 optionally includes wherein the instructions further configure the processing circuitry to: identify a normal operation period, the normal operation period being a period of time in which no FAFO event is indicated; monitor the network slice during the normal operation period using a variety of hardware components from the slice segment to capture performance data; and write combinations of the variety of hardware as a member of the set of hardware profiles in response to a given combination exceeding a predefined performance threshold.

In Example 5, the subject matter of any one or more of Examples 1-4 optionally include wherein an estimate of the capacity indicates that SLAs of the multiple network slices cannot be met, and wherein, to modify the operation of the slice segment, the processing circuitry is configured to request an admission controller to reduce traffic injection based on priority of traffic.

In Example 6, the subject matter of any one or more of Examples 1-5 optionally include wherein an estimate of the capacity indicates that SLAs of the multiple network slices cannot be met, and wherein, to modify the operation of the slice segment, the processing circuitry is configured to buffer latency tolerant traffic during the FAFO event.

In Example 7, the subject matter of any one or more of Examples 1-6 optionally include wherein an estimate of the capacity indicates that SLAs of the multiple network slices cannot be met, and wherein, to modify the operation of the slice segment, the processing circuitry is configured to direct a sender of network traffic to use a second network slice from the multiple network slices.

In Example 8, the subject matter of any one or more of Examples 1-7 optionally include wherein, to modify the slice segment, the processing circuitry is configured to allocate reserve hardware to the network slice, the reserve hardware being allocated to no network slice prior to allocation to the network slice.

In Example 9, the subject matter of Example 8 optionally includes wherein the reserve hardware is allocated to the network slice until a second modification to the slice segment is made.

In Example 10, the subject matter of any one or more of Examples 1-9 optionally include wherein the instructions further configure the processing circuitry to: monitor operation of the network slice over a sliding time period to produce: a slice-segment-resource-busy-ratio (SSR-BR) for a hardware resource, across all applications or network slices using the slice segment, of the slice segment; and a slice-segment-resource occupancy-ratio (SSR-OR) for the hardware resource for a single application of the network slice or the network slice alone.

In Example 11, the subject matter of Example 10 optionally includes wherein the instructions further configure the processing circuitry to: determine that the SSR-BR is beyond a threshold; and create the indication of the FAFO event in response to determining that the SSR-BR is beyond the threshold.

In Example 12, the subject matter of Example 11 optionally includes wherein the threshold is based on a priority of an application generating the SSR-BR.

In Example 13, the subject matter of any one or more of Examples 10-12 optionally include wherein the instructions further configure the processing circuitry to: determine that the SSR-OR is beyond a threshold; and in response: prevent access to the hardware resource until the SSR-OR meets the threshold; limit access to the hardware resource until the SSR-OR meets the threshold; or buffer latency tolerant traffic for a predefined period of time.

In Example 14, the subject matter of Example 13 optionally includes wherein the threshold is based on a priority of an application generating the SSR-OR.

Example 15 is a method for network slice resiliency, the method comprising: receiving, by processing circuitry of a network slice controller, an indication of a fault-attack-failure-outage (FAFO) event for a network slice, the network slice being one of multiple network slices; estimating, by the processing circuitry, capacity in a slice segment to meet service level agreement (SLA) of the multiple network slices based on the FAFO event, the slice segment being a set of physical resources shared by the multiple network slices; and modifying operation of the slice segment based on results from estimating the capacity in the slice segment.

In Example 16, the subject matter of Example 15 optionally includes wherein hardware allocated to a second network slice is estimated to be unnecessary for the second network slice to meet an SLA defined for the second network slice, and wherein modifying the operation of the slice segment includes allocating the hardware reserved for the second network slice to the network slice.

In Example 17, the subject matter of Example 16 optionally includes wherein the hardware is indicated in a set of hardware profiles maintained for the network slice, wherein a member of the set of hardware profiles indicates a combination of hardware evaluated to meet an SLA for the network slice.

In Example 18, the subject matter of Example 17 optionally includes identifying a normal operation period, the normal operation period being a period of time in which no FAFO event is indicated; monitoring the network slice during the normal operation period using a variety of hardware components from the slice segment to capture performance data; and writing combinations of the variety of hardware as a member of the set of hardware profiles in response to a given combination exceeding a predefined performance threshold.

In Example 19, the subject matter of any one or more of Examples 15-18 optionally include wherein estimating the capacity indicates that SLAs of the multiple network slices cannot be met, and wherein modifying the operation of the slice segment includes requesting an admission controller to reduce traffic injection based on priority of traffic.

In Example 20, the subject matter of any one or more of Examples 15-19 optionally include wherein estimating the capacity indicates that SLAs of the multiple network slices cannot be met, and wherein modifying the operation of the slice segment includes buffering latency tolerant traffic during the FAFO event.

In Example 21, the subject matter of any one or more of Examples 15-20 optionally include wherein estimating the capacity indicates that SLAs of the multiple network slices cannot be met, and wherein modifying the operation of the slice segment includes directing a sender of network traffic to use a second network slice from the multiple network slices.

In Example 22, the subject matter of any one or more of Examples 15-21 optionally include wherein modifying the slice segment includes allocating reserve hardware to the network slice, the reserve hardware being allocated to no network slice prior to allocation to the network slice.

In Example 23, the subject matter of Example 22 optionally includes wherein the reserve hardware is allocated to the network slice until a second modification to the slice segment is made.

In Example 24, the subject matter of any one or more of Examples 15-23 optionally include monitoring operation of the network slice over a sliding time period to produce: a slice-segment-resource-busy-ratio (SSR-BR) for a hardware resource, across all applications or network slices using the slice segment, of the slice segment; and a slice-segment-resource occupancy-ratio (SSR-OR) for the hardware resource for a single application of the network slice or the network slice alone.

In Example 25, the subject matter of Example 24 optionally includes determining that the SSR-BR is beyond a threshold; and creating the indication of the FAFO event in response to determining that the SSR-BR is beyond the threshold.

In Example 26, the subject matter of Example 25 optionally includes wherein the threshold is based on a priority of an application generating the SSR-BR.

In Example 27, the subject matter of any one or more of Examples 24-26 optionally include determining that the SSR-OR is beyond a threshold; and in response: preventing access to the hardware resource until the SSR-OR meets the threshold; limiting access to the hardware resource until the SSR-OR meets the threshold; or buffering latency tolerant traffic for a predefined period of time.

In Example 28, the subject matter of Example 27 optionally includes wherein the threshold is based on a priority of an application generating the SSR-OR.

Example 29 is a machine readable medium including instructions for network slice resiliency, the instructions, when executed by processing circuitry, cause the processing circuitry to perform operations comprising: receiving, by processing circuitry of a network slice controller, an indication of a fault-attack-failure-outage (FAFO) event for a network slice, the network slice being one of multiple network slices; estimating, by the processing circuitry, capacity in a slice segment to meet service level agreement (SLA) of the multiple network slices based on the FAFO event, the slice segment being a set of physical resources shared by the multiple network slices; and modifying operation of the slice segment based on results from estimating the capacity in the slice segment.

In Example 30, the subject matter of Example 29 optionally includes wherein hardware allocated to a second network slice is estimated to be unnecessary for the second network slice to meet an SLA defined for the second network slice, and wherein modifying the operation of the slice segment includes allocating the hardware reserved for the second network slice to the network slice.

In Example 31, the subject matter of Example 30 optionally includes wherein the hardware is indicated in a set of hardware profiles maintained for the network slice, wherein a member of the set of hardware profiles indicates a combination of hardware evaluated to meet an SLA for the network slice.

In Example 32, the subject matter of Example 31 optionally includes wherein the operations comprise: identifying a normal operation period, the normal operation period being a period of time in which no FAFO event is indicated; monitoring the network slice during the normal operation period using a variety of hardware components from the slice segment to capture performance data; and writing combinations of the variety of hardware as a member of the set of hardware profiles in response to a given combination exceeding a predefined performance threshold.

In Example 33, the subject matter of any one or more of Examples 29-32 optionally include wherein estimating the capacity indicates that SLAs of the multiple network slices cannot be met, and wherein modifying the operation of the slice segment includes requesting an admission controller to reduce traffic injection based on priority of traffic.

In Example 34, the subject matter of any one or more of Examples 29-33 optionally include wherein estimating the capacity indicates that SLAs of the multiple network slices cannot be met, and wherein modifying the operation of the slice segment includes buffering latency tolerant traffic during the FAFO event.

In Example 35, the subject matter of any one or more of Examples 29-34 optionally include wherein estimating the capacity indicates that SLAs of the multiple network slices cannot be met, and wherein modifying the operation of the slice segment includes directing a sender of network traffic to use a second network slice from the multiple network slices.

In Example 36, the subject matter of any one or more of Examples 29-35 optionally include wherein modifying the slice segment includes allocating reserve hardware to the network slice, the reserve hardware being allocated to no network slice prior to allocation to the network slice.

In Example 37, the subject matter of Example 36 optionally includes wherein the reserve hardware is allocated to the network slice until a second modification to the slice segment is made.

In Example 38, the subject matter of any one or more of Examples 29-37 optionally include wherein the operations comprise: monitoring operation of the network slice over a sliding time period to produce: a slice-segment-resource-busy-ratio (SSR-BR) for a hardware resource, across all applications or network slices using the slice segment, of the slice segment; and a slice-segment-resource occupancy-ratio (SSR-OR) for the hardware resource for a single application of the network slice or the network slice alone.

In Example 39, the subject matter of Example 38 optionally includes wherein the operations comprise: determining that the SSR-BR is beyond a threshold; and creating the indication of the FAFO event in response to determining that the SSR-BR is beyond the threshold.

In Example 40, the subject matter of Example 39 optionally includes wherein the threshold is based on a priority of an application generating the SSR-BR.

In Example 41, the subject matter of any one or more of Examples 38-40 optionally include wherein the operations comprise: determining that the SSR-OR is beyond a threshold; and in response: preventing access to the hardware resource until the SSR-OR meets the threshold; limiting access to the hardware resource until the SSR-OR meets the threshold; or buffering latency tolerant traffic for a predefined period of time.

In Example 42, the subject matter of Example 41 optionally includes wherein the threshold is based on a priority of an application generating the SSR-OR.

Example 43 is a system for network slice resiliency, the system comprising: means for receiving, by processing circuitry of a network slice controller, an indication of a fault-attack-failure-outage (FAFO) event for a network slice, the network slice being one of multiple network slices; means for estimating, by the processing circuitry, capacity in a slice segment to meet service level agreement (SLA) of the multiple network slices based on the FAFO event, the slice segment being a set of physical resources shared by the multiple network slices; and means for modifying operation of the slice segment based on results from estimating the capacity in the slice segment.

In Example 44, the subject matter of Example 43 optionally includes wherein hardware allocated to a second network slice is estimated to be unnecessary for the second network slice to meet an SLA defined for the second network slice, and wherein the means for modifying the operation of the slice segment include means for allocating the hardware reserved for the second network slice to the network slice.

In Example 45, the subject matter of Example 44 optionally includes wherein the hardware is indicated in a set of hardware profiles maintained for the network slice, wherein a member of the set of hardware profiles indicates a combination of hardware evaluated to meet an SLA for the network slice.

In Example 46, the subject matter of Example 45 optionally includes means for identifying a normal operation period, the normal operation period being a period of time in which no FAFO event is indicated; means for monitoring the network slice during the normal operation period using a variety of hardware components from the slice segment to capture performance data; and means for writing combinations of the variety of hardware as a member of the set of hardware profiles in response to a given combination exceeding a predefined performance threshold.

In Example 47, the subject matter of any one or more of Examples 43-46 optionally include wherein the means for estimating the capacity indicates that SLAs of the multiple network slices cannot be met, and wherein the means for modifying the operation of the slice segment include means for requesting an admission controller to reduce traffic injection based on priority of traffic.

In Example 48, the subject matter of any one or more of Examples 43-47 optionally include wherein the means for estimating the capacity indicates that SLAs of the multiple network slices cannot be met, and wherein the means for modifying the operation of the slice segment include means for buffering latency tolerant traffic during the FAFO event.

In Example 49, the subject matter of any one or more of Examples 43-48 optionally include wherein the means for estimating the capacity indicates that SLAs of the multiple network slices cannot be met, and wherein the means for modifying the operation of the slice segment include means for directing a sender of network traffic to use a second network slice from the multiple network slices.

In Example 50, the subject matter of any one or more of Examples 43-49 optionally include wherein the means for modifying the slice segment include means for allocating reserve hardware to the network slice, the reserve hardware being allocated to no network slice prior to allocation to the network slice.

In Example 51, the subject matter of Example 50 optionally includes wherein the reserve hardware is allocated to the network slice until a second modification to the slice segment is made.

In Example 52, the subject matter of any one or more of Examples 43-51 optionally include means for monitoring operation of the network slice over a sliding time period to produce: a slice-segment-resource-busy-ratio (SSR-BR) for a hardware resource, across all applications or network slices using the slice segment, of the slice segment; and a slice-segment-resource occupancy-ratio (SSR-OR) for the hardware resource for a single application of the network slice or the network slice alone.

In Example 53, the subject matter of Example 52 optionally includes means for determining that the SSR-BR is beyond a threshold; and means for creating the indication of the FAFO event in response to determining that the SSR-BR is beyond the threshold.

In Example 54, the subject matter of Example 53 optionally includes wherein the threshold is based on a priority of an application generating the SSR-BR.

In Example 55, the subject matter of any one or more of Examples 52-54 optionally include means for determining that the SSR-OR is beyond a threshold; and in response: means for preventing access to the hardware resource until the SSR-OR meets the threshold; means for limiting access to the hardware resource until the SSR-OR meets the threshold; or means for buffering latency tolerant traffic for a predefined period of time.

In Example 56, the subject matter of Example 55 optionally includes wherein the threshold is based on a priority of an application generating the SSR-OR.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A network node for network slice resiliency, the network node comprising:
   a network interface;
   a memory including instructions; and
   processing circuitry that, when in operation, is configured by the instructions to:
      receive, via the network interface, an indication of a fault-attack-failure-outage (FAFO) event for a network slice, the network slice being one of multiple network slices;
      estimate capacity in a slice segment to meet a service level agreement (SLA) of the multiple network slices based on the FAFO event, the slice segment being a set of physical resources shared by the multiple network slices; and
      modify operation of the slice segment based on results from estimating the capacity in the slice segment, wherein, based on the FAFO event, hardware allocated to a second network slice is estimated to be unnecessary for the second network slice to meet an SLA defined for the second network slice, and wherein, to modify the operation of the slice segment, the processing circuitry is configured to allocate the hardware reserved for the second network slice to the network slice.

2. The network node of claim 1, wherein the hardware is indicated in a set of hardware profiles maintained for the network slice, wherein a member of the set of hardware profiles indicates a combination of hardware evaluated to meet an SLA for the network slice.

3. The network node of claim 2, wherein the instructions further configure the processing circuitry to:
   identify a normal operation period, the normal operation period being a period of time in which no FAFO event is indicated;
   monitor the network slice during the normal operation period using a variety of hardware components from the slice segment to capture performance data; and
   write combinations of the variety of hardware as a member of the set of hardware profiles in response to a given combination exceeding a predefined performance threshold.

4. The network node of claim 1, wherein, to modify the slice segment, the processing circuitry is configured to allocate reserve hardware to the network slice, the reserve hardware not allocated to any network slice prior to allocation to the network slice.

5. The network node of claim 1, wherein the instructions further configure the processing circuitry to:
   monitor operation of the network slice over a sliding time period to produce:
      a slice-segment-resource-busy-ratio (SSR-BR) for a hardware resource, across all applications or network slices using the slice segment, of the slice segment; and
      a slice-segment-resource occupancy-ratio (SSR-OR) for the hardware resource for a single application of the network slice or the network slice alone.

6. The network node of claim 5, wherein the instructions further configure the processing circuitry to:
   determine that the SSR-BR is beyond a threshold; and
   create the indication of the FAFO event in response to determining that the SSR-BR is beyond the threshold.

7. The network node of claim 5, wherein the instructions further configure the processing circuitry to:
   determine that the SSR-OR is beyond a threshold; and
   in response:
      prevent access to the hardware resource until the SSR-OR meets the threshold;
      limit access to the hardware resource until the SSR-OR meets the threshold; or
      buffer latency tolerant traffic for a predefined period of time.

8. The network node of claim 1, wherein an estimate of the capacity indicates that SLAs of the multiple network slices cannot be met, and wherein, to modify the operation of the slice segment, the processing circuitry is configured to buffer latency tolerant traffic during the FAFO event.

9. A method for network slice resiliency, the method comprising:
   receiving, by processing circuitry of a network slice controller, an indication of a fault-attack-failure-outage (FAFO) event for a network slice, the network slice being one of multiple network slices;
   estimating, by the processing circuitry, capacity in a slice segment to meet a service level agreement (SLA) of the multiple network slices based on the FAFO event, the slice segment being a set of physical resources shared by the multiple network slices; and
   modifying operation of the slice segment based on results from estimating the capacity in the slice segment, wherein, based on the FAFO event, hardware allocated to a second network slice is estimated to be unnecessary for the second network slice to meet an SLA defined for the second network slice, and wherein modifying the operation of the slice segment includes allocating the hardware reserved for the second network slice to the network slice.

10. The method of claim 9, wherein the hardware is indicated in a set of hardware profiles maintained for the network slice, wherein a member of the set of hardware profiles indicates a combination of hardware evaluated to meet an SLA for the network slice.

11. The method of claim 10, comprising:
   identifying a normal operation period, the normal operation period being a period of time in which no FAFO event is indicated;
   monitoring the network slice during the normal operation period using a variety of hardware components from the slice segment to capture performance data; and writing combinations of the variety of hardware as a member of the set of hardware profiles in response to a given combination exceeding a predefined performance threshold.

12. The method of claim 9, wherein modifying the slice segment includes allocating reserve hardware to the network slice, the reserve hardware not allocated to any network slice prior to allocation to the network slice.

13. The method of claim 9, comprising:
monitoring operation of the network slice over a sliding time period to produce:
    a slice-segment-resource-busy-ratio (SSR-BR) for a hardware resource, across all applications or network slices using the slice segment, of the slice segment; and
    a slice-segment-resource occupancy-ratio (SSR-OR) for the hardware resource for a single application of the network slice or the network slice alone.

14. The method of claim 13, comprising:
determining that the SSR-BR is beyond a threshold; and
creating the indication of the FAFO event in response to determining that the SSR-BR is beyond the threshold.

15. The method of claim 13, comprising:
determining that the SSR-OR is beyond a threshold; and in response:
    preventing access to the hardware resource until the SSR-OR meets the threshold;
    limiting access to the hardware resource until the SSR-OR meets the threshold; or
    buffering latency tolerant traffic for a predefined period of time.

16. The method of claim 9, wherein estimating the capacity indicates that SLAs of the multiple network slices cannot be met, and wherein modifying the operation of the slice segment includes buffering latency tolerant traffic during the FAFO event.

17. A non-transitory machine readable medium including instructions for network slice resiliency, the instructions, when executed by processing circuitry, cause the processing circuitry to perform operations comprising:
    receiving, by processing circuitry of a network slice controller, an indication of a fault-attack-failure-outage (FAFO) event for a network slice, the network slice being one of multiple network slices;
    estimating, by the processing circuitry, capacity in a slice segment to meet a service level agreement (SLA) of the multiple network slices based on the FAFO event, the slice segment being a set of physical resources shared by the multiple network slices; and
    modifying operation of the slice segment based on results from estimating the capacity in the slice segment, wherein, based on the FAFO event, hardware allocated to a second network slice is estimated to be unnecessary for the second network slice to meet an SLA defined for the second network slice, and wherein modifying the operation of the slice segment includes allocating the hardware reserved for the second network slice to the network slice.

18. The non-transitory machine readable medium of claim 17, wherein the hardware is indicated in a set of hardware profiles maintained for the network slice, wherein a member of the set of hardware profiles indicates a combination of hardware evaluated to meet an SLA for the network slice.

19. The non-transitory machine readable medium of claim 18, wherein the operations comprise:
    identifying a normal operation period, the normal operation period being a period of time in which no FAFO event is indicated;
    monitoring the network slice during the normal operation period using a variety of hardware components from the slice segment to capture performance data; and
    writing combinations of the variety of hardware as a member of the set of hardware profiles in response to a given combination exceeding a predefined performance threshold.

20. The non-transitory machine readable medium of claim 17, wherein modifying the slice segment includes allocating reserve hardware to the network slice, the reserve hardware not allocated to any network slice prior to allocation to the network slice.

21. The non-transitory machine readable medium of claim 17, wherein the operations comprise:
    monitoring operation of the network slice over a sliding time period to produce:
        a slice-segment-resource-busy-ratio (SSR-BR) for a hardware resource, across all applications or network slices using the slice segment, of the slice segment; and
        a slice-segment-resource occupancy-ratio (SSR-OR) for the hardware resource for a single application of the network slice or the network slice alone.

22. The non-transitory machine readable medium of claim 21, wherein the operations comprise:
    determining that the SSR-BR is beyond a threshold; and
    creating the indication of the FAFO event in response to determining that the SSR-BR is beyond the threshold.

23. The non-transitory machine readable medium of claim 21, wherein the operations comprise:
    determining that the SSR-OR is beyond a threshold; and in response:
        preventing access to the hardware resource until the SSR-OR meets the threshold;
        limiting access to the hardware resource until the SSR-OR meets the threshold; or
        buffering latency tolerant traffic for a predefined period of time.

24. The non-transitory machine readable medium of claim 17, wherein estimating the capacity indicates that SLAs of the multiple network slices cannot be met, and wherein modifying the operation of the slice segment includes buffering latency tolerant traffic during the FAFO event.

* * * * *